United States Patent [19]

Hargarter et al.

[11] Patent Number: 5,674,600

[45] Date of Patent: Oct. 7, 1997

[54] LAMINATING FILM WITHOUT A RELEASE LAYER, PROCESS FOR THE PRODUCTION THEREOF AND USE THEREOF

[75] Inventors: Nicole Hargarter, Charlottesville, Va.; Dirk Schultze; Reinhard Kunold, both of Fallingbostel, Germany

[73] Assignee: Wolff Walsrode Aktiengesellschaft, Walsrode, Germany

[21] Appl. No.: 679,354

[22] Filed: Jul. 10, 1996

[30] Foreign Application Priority Data

Jul. 17, 1995 [DE] Germany ............... 195 25 971.8

[51] Int. Cl.$^6$ ...................................... B32B 9/00
[52] U.S. Cl. ............... 428/212; 428/34.3; 428/35.9; 428/85; 428/283; 428/288; 428/311.5; 428/315.9; 428/423.7; 428/424.8; 428/913; 156/308.2; 156/324
[58] Field of Search ............... 428/283, 286, 428/288, 311.5, 315.9, 34.3, 35.9, 424.8, 220, 423.7, 297, 296, 85, 137, 34.9, 913; 156/308.2, 324

[56] References Cited

U.S. PATENT DOCUMENTS

| | | | |
|---|---|---|---|
| 3,880,691 | 4/1975 | Pannenbecker et al. | 156/244 |
| 4,877,856 | 10/1989 | Hall et al. | 528/44.79 |

Primary Examiner—Patrick Ryan
Assistant Examiner—Abraham Bahta
Attorney, Agent, or Firm—Sprung Kramer Schaefer & Briscoe

[57] ABSTRACT

The present invention relates to a film of at least two layers having at least one side softening at a lower temperature and at least one side softening at a higher temperature, wherein the higher-softening side substantially consists of a thermoplastic polyurethane which softens at above 100° C. on a Kofler hot bench and the median of the softening range is at least 15° C. above that of the lower-softening layer and the matrix component of the lower-softening side consists of at least one hot-bonding thermoplastic material from the group comprising polyamides, polyesters and polyurethanes having a median of the softening range on a Kofler hot bench of below 100° C. and at least one additive component from the group comprising a) additive masterbatches containing inorganic particles, b) additive masterbatches containing organic particles with thermoplastic matrix resins is added to the lower-softening layer.

13 Claims, No Drawings

LAMINATING FILM WITHOUT A RELEASE LAYER, PROCESS FOR THE PRODUCTION THEREOF AND USE THEREOF

This invention relates to elastic, thermoplastic laminating films which consist of at least one higher-melting and at least one low-melting hot-bonding layer, wherein the hot-bonding layer, which softens at below 100° C., is modified in such a manner that it may be produced without an additional release layer, it does not block on the reel and nevertheless retains its hot-bonding properties as a necessary characteristic for its use according to the invention. At least one higher-melting layer consists of thermoplastic polyurethanes.

Many variants of plastic films are known. Hot melt adhesive fills are a particular embodiment. Hot melt adhesive fills, their properties and advantages, together with processes for the production thereof from conventional granulated and powdered hot melt pressure sensitive adhesives are described, for example, in U.S. Pat. No. 4,379,117 (Grace) or DE 2 114 065 (Plate Bonn). DE 3 911 613 (Audi), for example, describes the use of hot melt adhesive films. A general classification of adhesives may be found in Habenicht, Kleben, Springer Verlag, Berlin 1986. Hot melt adhesive films are known in embodiments as films having adhesive properties on both sides as well as laminating fills having adhesive properties on only one side.

According to the prior art, fills consisting of at least one hot-bonding, low-softening layer of a polymer resin and at least one higher-softening layer of a second polymer resin are known as laminating films. Film structures consisting of at least one low-softening and one higher-softening layer are known from the packaging sector, in particular from food packaging. The films used in this sector are usually produced from polyolefins, which have only low hot-bonding properties. In contrast with the use of laminating fills, in which a bond is formed between a film with adhesive properties on one side with inter alia a non-adhesive substrate, in heat sealable packaging two heat sealing layers are fused together.

Laminating films thus differ from pressure sensitive adhesive films produced from a support which is coated with a pure pressure sensitive adhesive, as are for example described in WO 92/22619 (Minnesota Mining & Manufacturing Company). It is not only at elevated temperatures that these films offer inadequate adhesive power and they may moreover too readily be detached from the substrate.

Known applications for laminating films is the provision of a skin on porous articles, such as for example foams, woven goods and non-woven materials. The purpose of providing this skin is inter alia to produce a smooth surface and thus provide protection against the penetration or passage of fluids, generally to provide protection against water. Foam systems may thus be protected inter alia against rotting by the provision of a skin. The articles provided with a skin in this manner may moreover readily be printed or painted, which is not straightforwardly possible with porous surfaces.

In industrial applications, the properties of the widely used and low cost polyolefins are often insufficient, such that laminating films made from engineering thermoplastics such as polyamides, polyesters or also combinations thereof must be used. This is particularly the case when substrates with polar surfaces are to be covered or when not only the adhesive, but also the cohesive properties of the adhesive are of decisive importance. If the laminating films are additionally intended to have elastic properties, polymer resins from the group of thermoplastic polyurethanes (TPU) are readily used for the layer which softens in the higher temperature range. This group includes both low-softening grades, so-called hot melts, and higher-softening standard grades.

TPU are readily used as the higher-softening layer in known elastic laminating films made from thermoplastic materials as they offer a wide range of relevant properties, such as elevated abrasion resistance and elevated tear strength combined with elevated elongation at break and good resilience. Commercially available TPU are in principle suitable as the higher-softening layer of laminating films, in particular those TPU which are already used for single-layer films or for the raw material formulations on which they are based.

Single-layer films made from higher-softening TPU, processes for the production thereof and the use thereof are known according to the prior art, for example from EP 0 308 683 (BF Goodrich), EP 0 526 858 (Elf Atochem), EP 0 571 868 (Wolff Walstode) or EP 0 603 680 (Wolff Walsrode). The structures described in these documents may be incorporated into laminating films as the higher-melting layer or layers or have already been incorporated into known laminating films of this type. The production of TPU films using substantially incompatible polymers as flatting agents in TPU elastomers is also described, for example, in DE 41 26 499 (Elastogran).

Laminating films for industrial applications preferably have better hot-bonding properties on one side. Their bond properties are moreover usually specially tailored to the substrate onto which they are to be bonded. The hot melt adhesive layer of the laminating film is preferably selected from the same class of materials as the substrate. For industrial applications, the raw materials for the hot melt adhesive layer are thus preferably selected from the group of raw materials comprising the classes of thermoplastic polyamides, polyesters and polyurethanes. Conventionally, these hot melt formulations are not homopolymers, but instead copolymers. Decisive material characteristics such as melting point, softening point, crystallisation behaviour and modulus of elasticity may be adjusted by copolymerisation. Within the stated classes, both more elastic and more rigid formulations are known.

Prior art hot melt raw materials offered for sale, which are available for film production, are conventionally offered for sale as granulated or powdered products. Since they are often also used as raw materials for the formulation of crosslinking adhesives, they preferably have hydroxyl end groups. If the Kofler hot bench softening range of the lower-softening layer is distinctly above 100° C., it is possible by means of purposeful cooling of the low-melting layer to produce the low-melting layer without an additional release layer. Such films made from polyamide are described, for example, in U.S. Pat. No. 3,762,986 (Allied Chemical Corporation). Corresponding films with a layer of copolyamide and a layer of TPU are described in EP 0 382 236 (BF Goodrich).

However, there is often a requirement to select the hot melt adhesive or heat sealing raw materials for the lower-softening layer such that they have a comparatively low softening range of below 100° C., so that they do not damage the material to be laminated or provided with a skin during processing. Such a requirement is common for the provision of a skin on foamed plastics. Hot melt adhesives with Kofler hot bench softening ranges of below 100° C. are thus conventional for this application. The melting points or melting range maxima of the lowest softening, commercially available adhesive raw materials are around 50° C., measured to DIN 53 736. Due to the molecular weight and crystallite size distributions conventional in plastics, the melting or softening range of such a material extends over a wide temperature. range of often up to 20° C., which means that these materials may have an appreciable tendency to stick or block even at relatively high ambient temperatures and should thus often be classed as permanently tacky.

If laminating fills are to be produced with a layer of very low-melting polymer resins, a release layer is often necessary for passage over rollers during production and/or in order to prevent blocking on the reel, because using such permanently tacky materials means that a web coated on one side with such an adhesive layer and wound into a roll, reel or winding cannot be unwound from the roll again because the front of the film sticks to the reverse. A permanent bond on the reel need not be formed to impair the processability of such a roll. In elastic materials such as TPU, even slight increases in the force necessary for unwinding may mean that the materials are so severely deformed under the tensile load that they can no longer reliably be processed.

In order to overcome the stated disadvantage, the free surfaces of the adhesive layer in known prior art elastic laminating fills are provided with backing or release webs, which may readily be removed before the web is processed or bonded to a substrate. According to the prior art, the term backing or release layer is taken to mean a web which covers at least one of the sides of known prior art laminating films and is wound together with the laminating film, in order to prevent sticking or blocking of the individual turns of the roll on the reel. When the laminating film is unwound from the roll, the release layer remains on one side of the laminating film, but must be removed before the laminating film is put to its intended use.

If laminating films are to be produced which are provided with a heat sealing or hot melt layer which softens at below 100° C., at least one release layer is always necessary according to the prior art in order reliably to prevent blocking on the reel. Such structures made from TPU are described, for example, in DE 1 964 059 (Kalle). JA 61 086 262 (Toppan Printing), EP 0 002 465 (Bayer) or EP 0 024 740 (Plate Bonn) describe further processes for the production of such films. The last of these documents even describes the possibility of providing the laminating film with a release or protective film on both sides.

In the simplest case, polyethylene films may be used as release layers for laminating films having at least one layer from the group of the above-stated engineering thermoplastics, the polyamides, polyesters and TPU, which polyethylene films, even when unsiliconised, do not permanently adhere to polyurethane, copolyamide and copolyester hot melt pressure sensitive adhesive films and may thus be peeled off without further treatment. Prior art release layers may also consist of papers, films or other webs provided with silicone or other usual non-stick materials such as, for example, polytetrafluoroethylene.

The release layer materials must be produced separately, so increasing the price of the laminating films offered for sale. They are generally not wanted by the processor, who must separately unwind and often dispose of the release layer. They thus increase the cost of using laminating films and constitute an additional environmental impact.

Due to the dull, low-slip nature of the smooth surfaces of the low-softening layer of laminating films, various precautions must be taken during production and (further) processing in order to ensure rapid and unproblematic guidance of the film webs during production, use or conversion. One problem associated with the use of dull films is the formation of creases, which arise when tension is applied to the web and must be smoothed out before winding onto the reel or before contact with the substrate. Methods which may be considered for this purpose include inter alia the use of coated rollers and the greater than usual use of spreader rolls. In this connection, the processor in particular has considerable interest in a simplified and thus lower cost method of web guidance.

As an alternative to using release layer materials, it is also known to provide tacky or readily blocking materials with lubricants in such a manner that slip is achieved in machines and blocking on the reel is prevented. Using such materials in the lower-softening layer of the laminating film modifies the adhesive properties of this layer. The systems known for this purpose have the disadvantage that, due to surface occupation, they modify the adhesive or heat sealing properties or strength in such a manner that they do not achieve the initial performance of the unmodified material, even if processing parameters such as temperature, pressure and time are adjusted. Such lubricant, slip or non-stick systems are described, for example, by Brotz in *Taschenbuch der Kunststoff-Additive*, Gächter, Müller (eds.), 2nd edition, Hanser Verlag, Munich 1983.

It is also known to emboss fine structures on one side of the film, such that the contact area between the front and reverse of the laminating film is minimised on the roll. However, according to the prior art, it is necessary to add a small proportion of wax to at least one layer in order reliably to prevent blocking. Here too, an unwanted reduction in adhesive properties occurs due to migration of the wax to the film surface.

The object of the present invention is accordingly to provide a laminating film for providing a skin on porous materials, which film may be stored without a release layer on the higher-melting or lower-melting side, without blocking on the reel and without losing its hot-bonding properties. The film should moreover be easier to pass through conventional machinery than known prior art laminating films. It should also be possible to process them under the conditions conventional for known laminating films. Such conditions include in particular processing on thermal laminating calenders, processing on flat bed thermal laminators and bonding activated laminating films to substrates in a press downstream from activating station.

It has proved possible according to the invention to provide a laminating film which satisfies the stated requirements, which film is characterised in that the film of at least one higher-melting layer of TPU and a lower-softening layer of a hot melt material softening at below 100° C. on a Kofler hot bench from the classes of substances comprising thermoplastic polyamides, polyesters and/or polyurethanes with at least one minority component from one of the classes of substances stated below. According to the invention, the minority components are selected from classes of additive masterbatches based on polymer resin containing active components comprising a) inorganic particles
b) organic particles.

With regard to its formulation components, the higher-melting TPU layer corresponds to known prior art TPU fills.

In a particularly preferred embodiment, the fills according to the invention contain, as the matrix component of the additive masterbatches, thermoplastic polyurethanes which melt at at least 15° C. above the lower-melting polyurethane hot melt component.

In another embodiment, polyethylenes may be used as the matrix components of the additive masterbatches added to the lower-melting layer in the fills according to the invention. High pressure polyethylenes, which are also known as low density polyethylenes, are particularly preferred.

Particles which are suitable according to the invention are preferably those having an average particle size of less than 15 μm, which are contained in the additive masterbatches added to the lower-melting layer. Sieve analysis, for example to DIN 53 477, may advantageously be used to determine particle diameter. Particles containing $SiO_2$ or styrene polymers are particularly suitable.

Further layers of thermoplastic resins may optionally be embedded between the higher-melting TPU layer and the lower-melting layer of hot melt material of the above-stated classes of substances.

The minority component added to the matrix component of the lower-softening layers is distinguished in that it never completely occupies the surface of the lower-softening layer, which would impair adhesive properties. The basis of the mode of action of suitable minority components according to the invention is that during film production they produce locally raised areas or domains in the surface of the lower-softening layer of the laminating film according to the invention. Minority components suitable according to the invention soften or melt and crystallise or solidify at higher temperatures than the matrix components suitable as the lower-softening layer of the laminating film according to the invention. Crystallisation or solidification moreover proceed faster than in the matrix component. Once the hot melt adhesive film has cooled, the raised areas may thus act as spacers between two winds of film on the reel. Blocking is thus prevented between the higher-melting reverse of the laminating film of one wind and the lower-melting front of the laminating film of the next wind which are in contact on the reel. The raised areas moreover allow excellent slip properties through processing and convening machinery, such that any creases which occur can be smoothed out and the film reel has excellent uniformity.

In a preferred embodiment, the proportion of the minority components is between 5 wt. % and 40 wt. % of the total weight of the low-softening layer. In a particularly preferred embodiment, the proportion of the minority component is between 10 wt. % and 20 wt. % of the total weight of the low-softening layer.

Suitable starting materials for the matrix component of the lower-melting or lower-softening layer are the usual thermoplastic hot melt pressure sensitive adhesives available from known suppliers. Hot melt pressure sensitive adhesives from the classes of substances suitable according to the invention are offered for sale, for example, under the trade names Cepatex, Desmocoll, Dynapol, Estane, Griltex, Iromelt, Irostic, Platamid and Vestamelt. The hot melt adhesive raw materials used according to the invention are preferably hydroxyl-terminated. The hot melt adhesive raw materials from the classes of substances comprising thermoplastic polyamides, polyesters and/or polyurethanes are offered for sale in more rigid and in more readily deformable formulations. The more readily deformable formulations, characterised by their lower modulus of elasticity, are in each case preferred according to the invention.

The viscosity of substances suitable as matrix materials for the lower-softening layer is favourably described by their melt flow index (MFI). The melt flow indices for the matrix component of the lower-softening layer of the laminating film according to the invention are preferably between 1.5 g/10 min and 150 g/10 min, measured to DIN 53 735 at 160° C. with a test load of 2.16 kg.

Materials used according to the invention for the higher-melting or higher-softening thermoplastic TPU layer are those currently used as raw materials for known prior art single layer TPU films, as are commercially available, for example, under the trade names Dureflex, Platilon, Tuftane and Walopur, wherein their Kofler hot bench softening range is above 100° C. and at least 15° C. above that of the lower-softening layer. Suitable TPU are offered for sale, for example, under the trade names Desmopan, Elastollan, Estane, Irogran, Pellethane, Morthane, Tecoflex, Texin and Uceflex.

The suitability according to the invention of the minority component added to the lower-softening layer may be substantiated by quoting the lower coefficients of friction, measured to DIN 53 375, and the lower blocking values, measured to DIN 53 366 at 50° C.

According to the invention, preferred laminating films are those having a total thickness of between 30 μm and 200 μm. The thickness of the higher-melting layer is selected such that it will not appreciably soften when heated under processing conditions. Suitable thicknesses for this layer are between 10 μm and 150 μm. The thickness of the lower-softening layer is selected in accordance with the substrate to be covered in such a manner that an optimum bond is achieved. A thicker low-softening layer is selected inter alia for highly porous substrates, so that the largest possible bonding surface is created allowing for the uneven surface of the substrate and the consequent partial absorption of the hot melt adhesive layer. In contrast, a lower thickness of the hot melt adhesive layer is sufficient for smooth substrates. Accordingly, a thickness range of between 10/μm and 150 μm for the lower-softening layer is suitable according to the invention.

Suitable processes for the production of the laminating film according to the invention are in particular conventional thermal shaping processes for processing plastics into multi-layer flat materials. Processes which may be cited include production by coextension, which may be performed using the flat film process, for example with a casting roll or take-off calender, or using the blown film process. Providing a film produced as a single layer with a coating of a second layer is also suitable for the production of laminating films according to the invention. Also the transfer coating process in which the melt web of one layer is initially applied onto a support and joining with the second film or melt web which has been individually produced or also coated onto a support is then performed in a calender or other press unit. Lamination of two single layer films, possibly produced with a support, is also suitable. Of the stated production processes, coextrusion is particularly preferred due to the better adhesion of the composite which may be achieved.

The laminating film according to the invention is suitable for sealing porous materials and for providing articles with a surface of TPU. Thanks to the outstanding properties of the TPU, this upgrades surface quality with regard to abrasion and scratch resistance.

In a preferred application, the film according to the invention is stuck to porous substrates. To this end, lamination or sealing of porous substrates, in particular foamed plastics, textile materials, seams, non-woven materials, leather and/or skiver, with the laminating film according to the invention is performed by heating the lower-softening side of the film to or above its softening range and bringing the multi-layer film into contact with the substrate and bonding it, optionally with the application of additional pressure, wherein the softened side with the lower-softening range faces towards the substrate.

Heat may be applied to the layer with the lower-softening range, for example, with hot air, radiant heaters and/or heated rollers. Heat may be applied directly onto the lower-softening layer or through the higher-softening layer. According to the invention, it is preferred to apply heat directly onto the lower-softening layer. The film according to the invention may be subjected to thermal preactivation prior to use.

Sealing with the laminating films according to the invention may be achieved by thermal lamination, wherein no awkward or superfluous release layers need to be handled. The absence of the release layer improves the economic viability of thermal lamination in comparison with laminating films with release layers, so providing further encouragement to use thermal lamination in addition to its environmental advantages over flame lamination, due to the absence of burning. Thermal lamination with laminating films furthermore provides increased processing reliability, determined by the use of different techniques and the multilayer structure, with regard to the formation of punctures or pinholes, which are caused by burn-throughs in flame lamination, such that reduced film thicknesses are achievable. Such reduced thicknesses constitute a further economic and environmental advantage of the laminating films according to the invention.

Another preferred use is for sealing the seams of sewn materials which, apart from the seams, are otherwise already sealed, in particular of film-laminated textiles, textile/nonwoven and/or textile/foam composites. The stated film-laminated structures may equally well have been produced by flame or thermal lamination. Sewn structures may furthermore be protected from the passage of fluids in the seam areas by the use of laminating films according to the invention. Narrow strips or tapes of the laminating films according to the invention are preferably used for seam sealing. Tape width is preferably between 20 mm and 50 mm.

The seams of the above-stated structures may, depending upon the nature of the seam, be enclosed by the laminating films according to the invention or merely covered. In seam sealing, the lower-melting side of the laminating film is conventionally bonded to the film-laminated side of the above-stated structures. Where seams cross, the second seam, which crosses the seam which has been sealed first, is also sealed by the bonding of the lower-melting side of the laminating film for the second seam with the higher-melting side of the film used to seal the first seam.

The surface properties of the films according to the invention may be modified by known physical and chemical treatment methods, such as for example corona treatment.

The films described in the following examples and comparative examples were produced by blown film coextrusion. The structure of extruders suitable for plasticising thermoplastic resins is described, for example, by von Wortberg, Mahlke & Effen in *Kunststoffe*, 84 (1994) 1131–1138, by Pearson in *Mechanics of Polymer Processing*, Elsevier Publishers, New York, 1985 or by the company Davis-Standard in *Paper, Film & Foil Converter*, 64 (1990), pages 84–90. Dies for shaping the melt into films are described inter alia by Michaeli in Extrusions-Werkzeuge, Hanser Verlag, Munich 1991.

EXAMPLES

Example A

A film having a higher-melting layer of a conventional commercial ester-TPU of a Shore A hardness of 93 was produced using a two layer blown film die. Conventional additives, such as spacers and waxes, were added to this 50 µm thick layer. All the components used for this layer were melted together in an extruder.

The lower-softening layer was formed from a TPU hot melt material, to which was added 10 wt. % of a masterbatch containing $SiO_2$ and based on a conventional commercial ester-TPU of a Shore A hardness of 86. The additive masterbatch had an $SiO_2$ content of approximately 50 wt. %. The average size of the $SiO_2$ particles was less than 6 µm. The components required to form this 25 µm thick, lower-softening layer were plasticised in another extruder.

The two melt streams were superimposed in a two layer film blowing die and extruded from the die. The annular melt bubble was cooled by blowing with air, then flattened and the edges trimmed, so that two film webs could be separated. These were wound on separate winding devices.

Example B

A two-layer film was produced with a similar structure to that described in example A. However, an additive masterbatch containing polystyrene particles in a matrix of ether-TPU of a Shore A hardness of 87 was added to the lower-softening layer. The added proportion of this additive masterbatch was 10 wt. %, relative to the weight of the lower-softening layer. The polystyrene content of the masterbatch was below 50 wt. %. The average size of the polystyrene particles was less than 10 µm.

Example C

A two-layer fill was produced with a similar structure to that described in example A. However, an additive masterbatch containing $SiO_2$ in a matrix of high pressure polyethylene was added to the lower-softening layer.

The $SiO_2$ content of the masterbatch was approximately 50 wt. %. The average particle size was less than 15 µm.

Comparative example 1

A conventional commercial laminating film having a higher-melting TPU layer of a conventional commercial ester-TPU of a Shore A hardness of 93 was produced using a three layer blown film die. Conventional additives, such as spacers and waxes, were added to this 50 µm thick layer. All the components used for this layer were melted together in an extruder.

The 25 µm thick lower-softening layer was formed from a TPU hot melt material. The components required to form this lower-softening layer were plasticised in another extruder.

In order to prevent blocking of the fill on the reel, polyethylene was melted in a third extruder as a release layer material and extruded as a 30 µm thick layer.

The three melt streams were superimposed in a three layer film blowing die and extruded from the die. The annular melt bubble was cooled by blowing with air, then flattened and the edges trimmed, so that two film webs could be separated. These were wound on separate winding devices.

The PE release layer was unwound in a separate operation one week after production of the three layer film for the samples investigated in the tests.

Comparative example 2

A two-layer film was produced with a similar structure to that described in example A. No additional additives were added to the lower-softening layer, which was accordingly formed exclusively from low-softening TPU. This film blocked on the reel, i.e. it was possible to unwind the fill web only by applying considerably greater force and with deformation of the film.

Comparative example 3

A two-layer film was produced with a similar structure to that described in example A. However, an additive masterbatch containing waxes and lubricants in addition to the SiO$_2$ spacers was added to the lower-softening layer. The added proportion of this additive was 10 wt. %, relative to the weight of the lower-softening layer. The SiO$_2$ content in the masterbatch was approximately 50 wt. %, as in example A. The average size of the SiO$_2$ particles was less than 6 μm.

Tests on the samples produced in the examples and comparative examples:

Unwinding behaviour

Unwinding behaviour was tested by manual unrolling on a film reel clamped in an unwinding device.

Coefficients of static and dynamic friction

The coefficients of static and dynamic friction of the lower-softening side of the fills produced in the examples and comparative example were determined to DIN 53 375 for the film/metal contact pair.

Tensile test

Tensile testing was performed to DIN 53 455-7-5 on the films produced in the examples and comparative examples. The test specimens were cut from the film transversely relative to machine direction.

Roughness height

The roughness height of the lower-softening side of the film was investigated by mechanical scanning with a Perthometer tester from Feinpruf-Perthen. The stated roughness height complies with the definition stated in DIN 4768/1.

Standard blocking value

The standard blocking value was determined to DIN 53 366 at 50° C.

Softening range

The stated values for the Kofler hot bench softening range are based on the in-house method described below. (Film) specimens of the plastic to be investigated with a base area of at least 1 mm$^2$ are laid on a Kofler hot bench. Once these pieces have been on the Kofler hot bench for at least 60 seconds, a scalpel is used to determine the position on the hot bench at which the test pieces of plastic may be plastically deformed from the side without applying a large force. The position on the Kofler hot bench is then correlated with temperature. The maximum and minimum values determined on various test pieces indicate the upper and lower limits of the softening range.

The data in the following table, which characterise the films with regard to their properties according to the invention, clearly show that the films according to the invention described in the examples have advantages over the laminating films with an unmodified lower-softening layer described in the comparative examples.

TABLE 1

Properties of the films produced in the examples and comparative examples

| Property | Test method | Unit | Example A | Example B | Example C | Comparative example 1*) | Comparative example 2 | Comparative example 3 |
|---|---|---|---|---|---|---|---|---|
| Unwinding properties after storage not in excess of 30° C. | ./. | ./. | easy | easy | easy | easy | with severe deformation, very difficult | easy |
| Coefficient of static friction with film/metal contact pair | DIN 53 375 | ./. | 0.47 | 0.56 | 0.54 | 0.63 | ./. | 0.45 |
| Coefficient of dynamic friction with film/metal contact pair | DIN 53 375 | ./. | 0.61 | 0.99 | 0.67 | 1.00 | ./. | 0.60 |
| Maximum roughness height | DIN 4768/1 | μM | 2.3 | 1.4 | 2.3 | 0.4 | ./. | 2.3 |
| Softening range Matrix resin/lower-melting side | Kofler hot bench-in-house method | °C. | 74–78 | 74–78 | 74–78 | 74–78 | 74–78 | 74–78 |
| Softening range/higher-melting side | Kofler hot bench-in-house method | °C. | 135–145 | 135–145 | 135–145 | 135–145 | 135–145 | 135–145 |
| Elongation at break | DIN 53 455-7-5 | % | 519 | 486 | 467 | 455 | ./. | 504 |

TABLE 1-continued

Properties of the films produced in the examples and comparative examples

| Property | Test method | Unit | Example A | Example B | Example C | Comparative example 1*) | Comparative example 2 | Comparative example 3 |
|---|---|---|---|---|---|---|---|---|
| Tear strength | DIN 53 455-17-5 | N/mm² 54 | 53 | 55 | 58 | 58 | ./. | 54 |
| Standard blocking value/ 50° C. | DIN 53 366 | N/mm² | 0.73 | 0.88 | 0.58 | 1.46 | ./. | 0.66 |

The surface roughness of the hot-melt adhesive layer of the example films according to the invention is more than three times higher than that of comparative example film 1. This brings about windability without a release agent, which cannot be achieved with the film from comparative example 2. The higher surface roughness also brings about better slip properties, characterised by low coefficients of static and dynamic friction for the films produced in the examples.

The values determined here are lower than the values determined on the film from comparative example 1 once the PE release layer has been unwound. Better values were determined only on the films from comparative example 3 which had been provided with additional lubricants.

The values obtained from the tensile test, which are within the range of variation usual for elastic films, show that incorporation of the additive masterbatches does not impair the mechanical properties of the modified films in comparison with unmodified comparison film 1.

The standard blocking value for the films described in examples A, B and C, which is lower than that determined for the comparative example, is an impressive demonstration of the action according to the invention of the additives according to the invention: while the unmodified, low-softening side of the film from example 1 begins to exhibit an appreciable tendency to block from temperatures of only 50° C., this does not occur in the films produced in the examples.

In order to evaluate the strength of the composite, in particular the adhesive component of laminate strength, the lower-softening sides of the laminating films described in the examples and comparative examples were laminated to the corona pretreated side of a conventional commercial single layer TPU film, grade Walopur 2102 AK, 50 µm @. Lamination was performed between two heated rollers using a Paperplast "Jolly" model thermal laminating machine. The 400 mm wide laminating station consisting of a hard/soft pair of rollers was heated to a temperature of 126° C. The application pressure of the rollers was 100 bar. In order to handle the TPU films without stress at the advance speed of 2 m/min, they were placed between two oriented propylene films, grade Walothen C 20 SE @. No bond was formed between the TPU or laminating film and the polypropylene film during lamination. In order to provide two clamping ends for the characterising peel tests, another strip of the above-stated propylene film material was inserted as a release layer between the laminating film and the single layer TPU film.

Test strips of dimensions 210×15 mm were cut from the resultant TPU single layer film/laminating film laminates and the maximum peel force determined using a general purpose tensile tester supplied by Frank.

The bonding properties of the films produced in the examples and comparative examples were further investigated by using them in a standard model seam sealing machine supplied by Ardmel ("New MK. III Seam Sealing System").

In this model of the machine, the hot-melt side of the film is blown with hot air, melted and pressed against the substrate between two pressure rollers (rubber/steel pair). The steel pressure roller has a central groove to accommodate the seam to be covered.

Once optimised in preliminary testing, the following device parameters were not altered during testing: roller drive speed (device setting: 5), hot air flow velocity (device setting: 60 SCFH) and roller application pressure (device setting: 1.5 bar).

The substrates used were flame-laminated textile/cut foam/Walopur 2102 AK, 35 µm @ structures. The tapes were stuck to the corona pretreated side of the Walopur 2102 AK.

The composite adhesion of tapes made from the films described in the examples and comparative examples to the Walopur 2102 AK @ (flame-laminated structure, see above) was investigated at a hot air temperature of 265° C.

The adhesive/composite properties of the tapes were evaluated by means of manual peel tests on the cool composites (24 h after bonding). Adhesive properties were evaluated on the basis of the following grading system from the phenomena which were observed to occur when the tapes were slowly/carefully peeled off the substrate:

1. easy detachment from the base film (poor adhesive bond)
2. detachment from the base film with deformation of the base film
3. detachment from the base fill with simultaneous detachment of the base film from the underlying foam (good adhesive bond).

The observed detachment phenomena are subject to variation, which is partially determined by the machine: at the beginning of the taping process, the tape is briefly heated without advancing the pressure rollers, wherein the hot melt adhesive is reliably melted, such that the best bonding results are obtained from the first few centimetres of bonding. Once the tape machine is operating under steady conditions, comparatively poorer adhesion results are achieved. Evaluation was performed in areas in which it may be assumed that the taping process was operating under steady conditions.

TABLE 2

Evaluation of adhesive properties of films produced in the examples and comparative examples

| Characterisation of bond | Unit | Example A | Example B | Example C | Comparative example 1 | Comparative example 3 |
|---|---|---|---|---|---|---|
| Maximum peel force | N/15 mm | 16.8 | 15.7 | 17.0 | 17.5 | 3.0 |
| Bond to Walopur 2102 AK @ /tape machine | in accordance with above-stated grading system | 3 | 3/2 | 3 | 3 | 1 |

The adhesion tests given in table 2 show that modifying the lower-melting layer with an additive masterbatch according to the invention does not impair the adhesive properties of this hot melt layer in a manner extending beyond normal variation.

We claim:

1. A film having two outer layers, one side softening at a lower temperature and one side softening at a higher temperature, wherein the higher-softening side substantially consists of a thermoplastic polyurethane which softens at above 100° C. on a Kofler hot bench and the median of the softening range is at least 15° C. above that of the lower-softening layer; the matrix component of the lower-softening side consists of at least one hot-bonding thermoplastic material from the group comprising polyamides, polyesters and polyurethanes having a median of the softening range on a Kofler hot bench of below 100° C. and at least one additive component from the group comprising a) additive masterbatches containing inorganic particles,
   b) additive masterbatches containing organic particles, wherein the particles have an average particle size of less than 15 μm the additive masterbatches being added to the thermoplastic matrix resins of the lower-softening layer.

2. Film according to claim 1, wherein thermoplastic polyurethanes which melt at at least 15° C. above the lower-melting polyurethane hot melt component are used as the matrix component of the additive masterbatches.

3. Film according to claim 1, wherein polyethylene is used as the matrix component of the additive masterbatches added to the lower-softening layer.

4. Film according to claim 3, wherein high pressure polyethylene is used as the matrix component of the additive masterbatches added to the lower-softening layer.

5. Film according to claim 1 wherein the additive masterbatches added to the lower-softening layer contain spacers having an average particle size of less than 15 μm.

6. Film according to claim 1, wherein the particles added to the lower-softening layer by means of an additive masterbatch contain silicon dioxide.

7. Film according to claim 1, wherein the particles added to the lower-softening layer by means of an additive masterbatch contain styrene polymers.

8. Film according to claim 1, wherein the added additive masterbatch components to the matrix resin of the lower-softening layer are contained in the lower-softening layer in proportions of between 5 wt. % and 40 wt. %, in each case relative to the total weight of the raw materials contained in the lower-softening layer.

9. Film according to claim 1, wherein said film has a total thickness of between 30 μm and 200 μm, wherein the thickness of the higher-softening layer is between 10 μm and 150 μm and the thickness of the lower-softening layer is between 10 μm and 150 μm.

10. Film according to claim 1, wherein said film is it was produced using one of the processes for processing thermoplastics into multi-layer flat structures comprising coextrusion, coating, transfer coating and lamination.

11. Process for the lamination or sealing of porous substrates, with a laminating film according to claim 1, wherein the lower-softening side of the film is heated to or above its softening range and the multi-layer film is brought into contact with the substrate and bonded, wherein the softened side with the lower softening range faces towards the substrate.

12. Film according to claim 8, wherein the proportions range between 10 wt. % and 20 wt. %.

13. Process according to claim 11, wherein said porous substrate is selected from the group consisting of foamed plastics textile materials, seams, non-woven materials, leather and/or skiver.

* * * * *